United States Patent [19]

Fasig et al.

[11] 4,352,013
[45] Sep. 28, 1982

[54] TRACK SENSOR CONTROLLER

[75] Inventors: Harold A. Fasig, Plymouth; Eugene E. Paananen, Brighton, both of Mich.

[73] Assignee: Burroughs Corporation, Detroit, Mich.

[21] Appl. No.: 155,053

[22] Filed: Jun. 2, 1980

[51] Int. Cl.³ .............................................. G01V 9/04
[52] U.S. Cl. .................................. 250/223 R; 250/205
[58] Field of Search ............ 250/205, 214 R, 214 RC, 250/214 C, 223 R; 235/92 V; 356/434, 435; 271/263

[56] References Cited

U.S. PATENT DOCUMENTS

| | | | |
|---|---|---|---|
| 4,072,854 | 2/1978 | Oshima et al. | 250/223 R |
| 4,097,731 | 6/1978 | Krause et al. | 250/205 |
| 4,151,410 | 4/1979 | McMillan et al. | 271/263 |
| 4,237,378 | 12/1980 | Jones | 250/223 R |

Primary Examiner—David C. Nelms
Attorney, Agent, or Firm—Delbert P. Warner; Kevin R. Peterson

[57] ABSTRACT

An integrated circuit is shown for use as a controller for a track sensor used with document processors. The track sensor includes a light source and a light detector. The circuit monitors the signal from the light sensing portion of the sensor, comparing the signal with a standard value and providing a feedback signal to the light source to adjust the intensity of the light to compensate for the effects of aging, holes in a document, the accumulation of dirt on sensor lenses and the like. The circuit determines when the leading edge of a document arrives and when the trailing edges pass by. It includes elements which prevent false indications that the trailing edge has passed when holes go by the sensor.

7 Claims, 8 Drawing Figures

FIG.1.
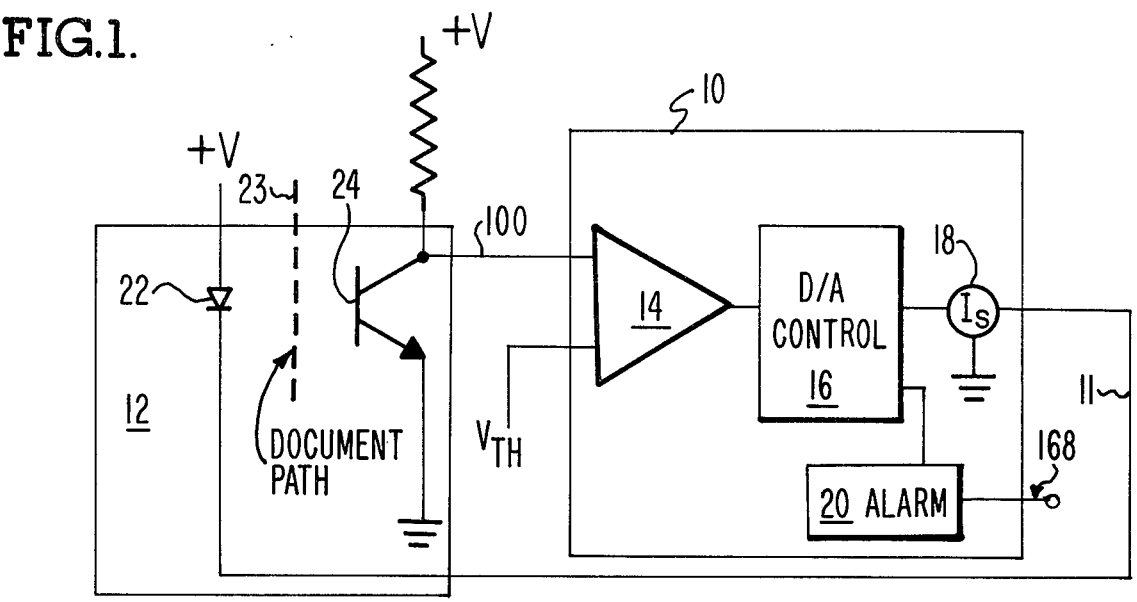
FIG.3.
FIG. 3B.
FIG. 3A.

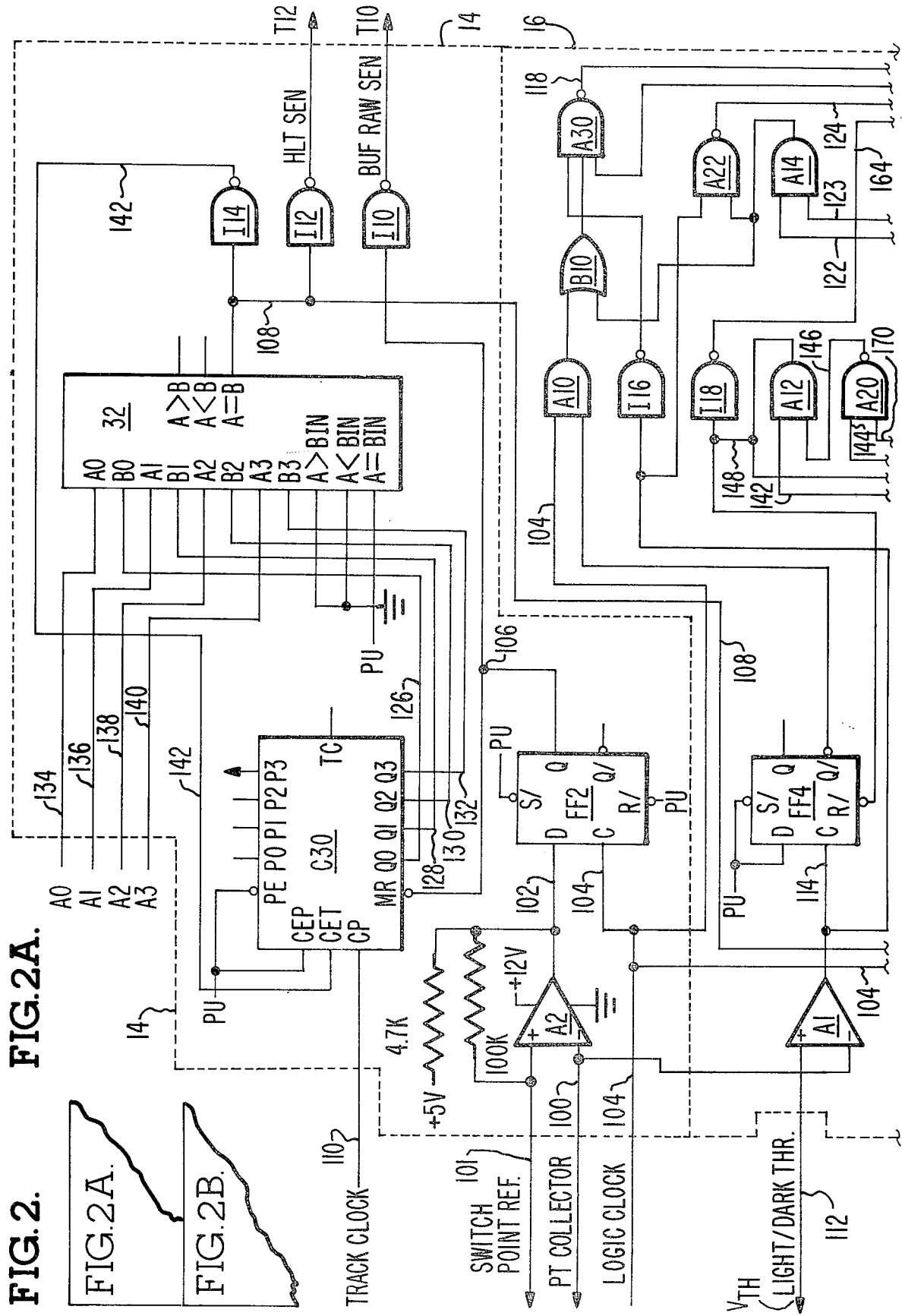

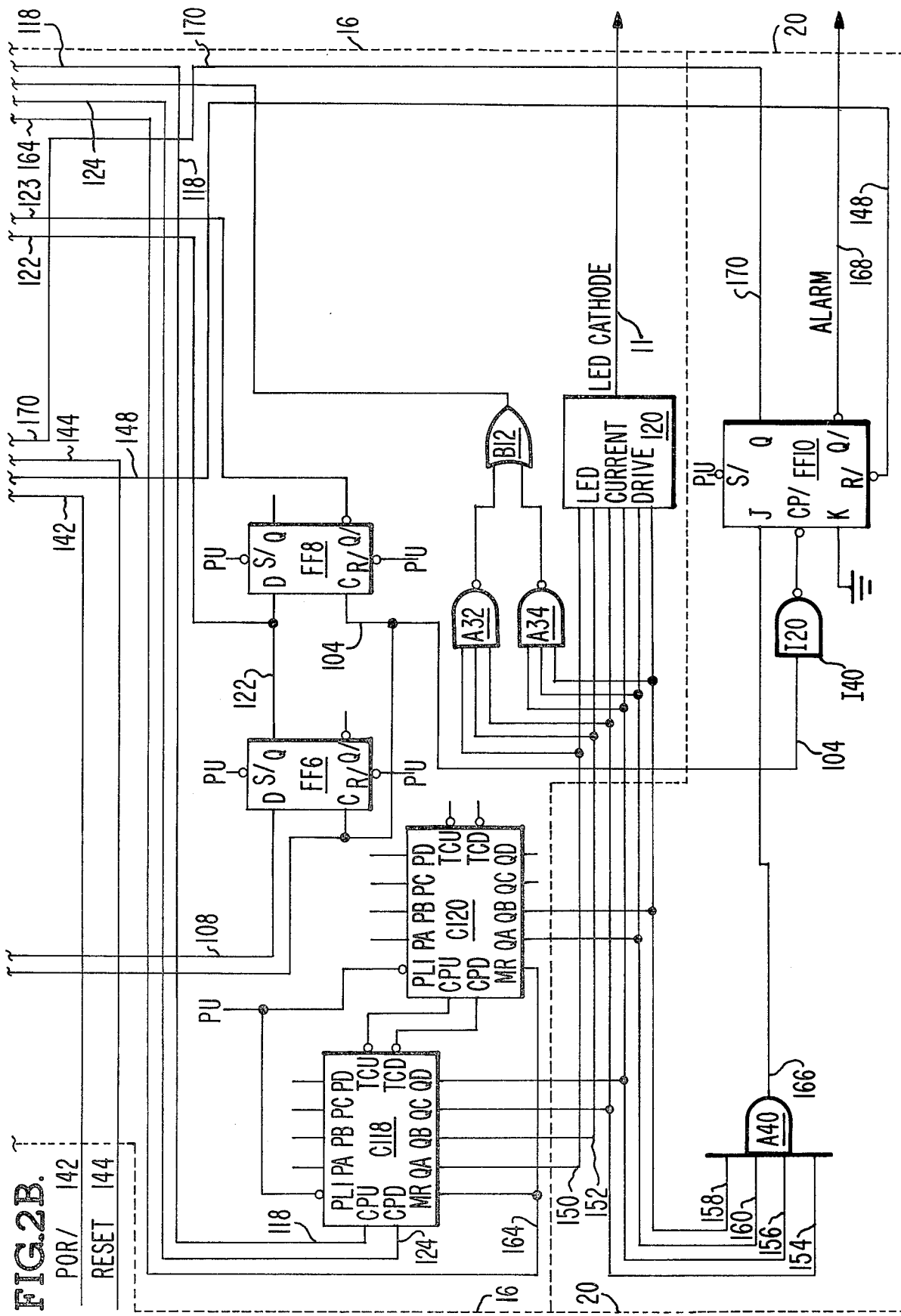

TRACK SENSOR CONTROLLER

CROSS REFERENCES TO RELATED APPLICATIONS

U.S. patent application No. 110,593 entitled "Constant Spacing Document Feeder," which was filed in the name of Daniel Alper on Jan. 9, 1980 and assigned to the same assignee as the present invention, is hereby incorporated by reference. U.S. patent application No. 164,004 entitled "Microprocessor Controlled Document Feeder," which was filed in the name of Harold A. Fasig on June 30, 1980 and now U.S. Pat. No. 4,331,328 and assigned to the same assignee as the present invention, is hereby incorporated by reference.

BACKGROUND OF THE INVENTION

1. Field of the Invention

The present invention relates to circuits for use as track sensor controllers for document processors. It relates further to integrated circuits of use as track sensor controllers for assuring that sensors are maintained at a level of sensitivity enabling them to detect the passage of documents with assurance while preventing false indication due to a variety of causes such as increased light transmission through holes or other flaws in the documents or due to changes in transparency of lenses caused by the accumulation of foreign matter on lenses of the sensors. The invention relates further to the provision of circuit designs of use in the production of integrated circuits to be used as track sensor controllers.

2. Description of the Prior Art

Among the known prior art devices are an "Automatic Gain Control for Photosensing Devices" described in U.S. Pat. No. 4,097,731 and 4,097,732. Those patents contain disclosures of sensors for use in apparatus where it is necessary to know when objects, such as documents, pass by a certain point and to provide a signal accordingly.

U.S. Pat. Nos. 4,097,731 and 4,097,732 relate to apparatus described therein as a beam-of-light (BOL) sensor having means for regulating the intensity of the sensor light source to compensate for extraneous factors in its operating environment, e.g., dust accumulation, component aging, misalignment, etc., that may affect consistent sensor operation. The BOL sensor includes a photosensor whose output signal is compared against a reference signal to determine if the light source intensity is of the proper level. The comparison signal is used to gate clock pulses to a counter to adjust its stored count upward or downward, dependent on whether the light source intensity is low or high, respectively. A hole filter is provided to filter out small, spurious apertures in a sensed object that would otherwise yield a double detection signal and cause an improper adjustment of the stored count.

The control apparatus disclosed in the referenced patents requires the interconnection of a number of distinct components to produce the desired results. Such as assemblage is very expensive when compared to integrated circuits produced in large quantities to provide the necessary control information. It is an object, therefore, of the present invention to provide for integrated circuits capable of operation as track sensor controllers.

BRIEF SUMMARY OF THE INVENTION

The present invention relates to a track sensor controller (TSC) which includes means for controlling the excitation current to an infrared LED positioned along the document travel path of a document sorting machine. The TSC provides current sufficient to maintain the average infrared intensity, as measured by a phototransistor mounted opposite the excited LED, at a preselected value. The TSC also includes logic means for preventing false indications, caused by holes or thin spots in a document, that a document has passed beyond the area covered by the sensor.

Several such LED phototransistor pairs will be positioned astride a document path along a transport track for use with TSC's in monitoring the progress of documents through the transport track of a document sorting machine.

In a preferred embodiment, the novel circuit for Track Sensor Controller will be produced as two TSC's on a single silicon chip in a 28-pin DIP.

BRIEF DESCRIPTION OF THE DRAWINGS

FIG. 1 is a schematic diagram illustrating the general configuration of a preferred track sensor controller and a sensor system for the sorter track of a document sorting machine.

FIGS. 2a and 2b are schematic drawings of an arrangement of electrical components in a preferred embodiment of a track sensor controller.

FIGS. 3A & 3B represent a buffered-raw-sensor signal and a hole-look-through-sensor signal of use in preventing false indications that the trailing edge of a document has passed the sensors.

DETAILED DESCRIPTION OF THE INVENTION

Figure 4:
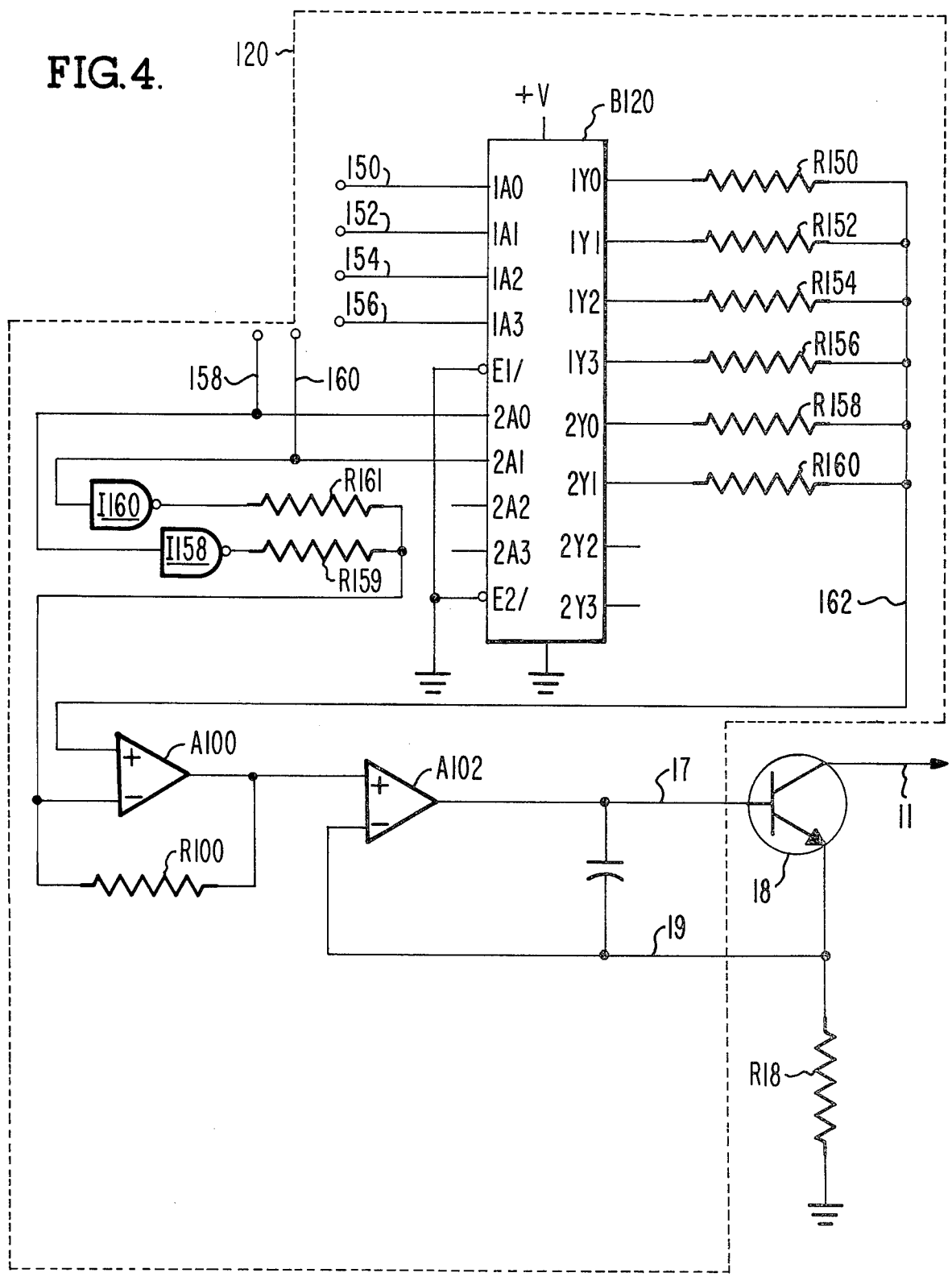
FIG. 4 is a digital-to-analog converter for changing digital signals to analog signals for direct control of an LED.

FIG. 1 is a schematic representation of a track sensor controller, or TSC, 10 and an associated sensing station 12. As indicated previously, the track sensor controller is of primary interest for the present invention. In a preferred embodiment, as described herein, the track sensor controller may be composed of a number of separate commercially available integrated circuits. In an embodiment preferred for use with a large number of document sorters, the TSC will comprise an integrated circuit combining the separate functions of the referenced separate integrated circuits.

The TSC at 10 includes three principle parts. The first of these is a document leading and trailing edge detector 14. A second part is a digital-to-analog (D/A) converter and its associated control logic at 16, which provides control for a current source $I_s$ shown at 18. A third part is a current alarm at 20 for providing an alarm signal when there is a failure of LED—phototransistor sensors or when other conditions occur which cause excursions of the D/A output beyond prescribed limits.

The sensing station at 12 will be positioned along the transport path of a document feeder, such as that disclosed in copending U.S. patent application 110,593 entitled "Constant Spacing Document Feeder," which is referenced above. The sensing station includes a light emitting diode or LED at 22 and a phototransistor or PT at 24 which are positioned along opposite sides of a document path so that, in the absence of an opaque obstruction, light from the diode will be intercepted by the phototransistor. A space, indicated by a dashed line 23 labelled "document path", is provided between the LED 22 and the PT 24 representing a space along the path of a document feeder for passage of documents. The documents generally are opaque and, when present, will obstruct light transmitted by the LED toward the PT.

When no documents are present in the document path, light from the LED at 22 to the PT at 24 will be established at a value determined by a comparison between the potential over line 100 from the collector of the phototransistor and a reference potential $V_{TH}$. If the collector value is high, the current supplied from current source 18 will be reduced to diminish the power supplied to the LED. If the potential on the collector is low, current supplied to the LED will be increased to increase the emission of light. When a document is moved through the document path, light from the LED is blocked between the time the leading edge and the trailing edge of the document pass between the LED and the PT, causing the TSC 10 to react as described in the following pages. In the event that light passes through a hole or a thin spot in a document, means are provided in the TSC to prevent a false indication that the trailing edge has passed.

LEADING AND TRAILING EDGE DETECTOR

The edge detector circuits 14, as shown in detail in FIG. 2, provide a means for precisely detecting the passage of the leading and trailing edges of each document moving along a document path between the LED 22 and the PT 24. They also provide a delayed trailing edge output signal or hole-look-through signal which is used to assure that holes or other light transmitting areas in the document do not cause false indications that the document has passed by. When the leading edge of an opaque document breaks the beam from the LED, a resulting change in conductivity of the phototransistors 24 causes the potential on the collector lead 100 to go higher and exceed the switch point reference potential on line 101, thereby causing the output over 102 of the differential comparator A2, which may be an SN72311, to go low. The low potential on 102 and clock pulses over 104 will be applied to the input terminals D & C respectively of a flip-flop, such as a 74LS74, at FF2 providing an output at node 106. This output is supplied as input to an SN74161 synchronous 4-bit counter C30 and also to an SN7404 inverter I10. Following receipt of a signal at terminal MR of C30, the counter will be reset and held reset either until a hole or a thin spot occurs in the document or until the document passes along the DOCUMENT PATH 23 beyond the point where it obstructs the light path between the LED 22 and the PT 24. When the counter C30 is reset, the A=B output of the four bit comparator 32 goes low and HLT SEN goes high. In response to the signal over 106 from flip-flop FF2, the inverter I10 will be energized to provide, at terminal T10, the leading edge of an output representing the buffered raw sensor signal, or BUF RAW SEN, as illustrated in FIGS. 3A.

When the trailing edge of a document passes beyond the path of the light between the light emitting diode 22 and the phototransistor 24, or a hole in a document allows light to pass between the LED 22 and the PT 24, the PT will be illuminated directly by light from the LED. This will cause the collector voltage over line 100 to the differential comparator A2 to go low and causes the output over 102 of the differential comparator to go high. The high over 102 causes the flip-flop FF2 to change its output over 106 enabling the counter C30 to start counting pulses again. The output over 106 also changes the output of I10 causing the output, shown by the waveform in FIG. 3A, to go low.

As indicated above, when the beam from the LED strikes the phototransistor due to passage of the trailing edge of a document or the occurrence of a hole in the document, the comparator A2's output goes high and counter C30 is allowed to count. The resulting outputs of C30 from Q0, Q1, Q2 and Q3 over lines 126, 128, 130 and 132 are then compared in comparator 32 with programmed inputs over lines 134, 136, 138 and 140 from terminals A0, A1, A2 and A3. The count from C30 continues until the count equals the A0-A3 program to establish from 0 to 15 track clock periods, according to the requirements of the program. As a consequence, HLT SEN's trailing or negative edge over terminal T10, indicated in FIG. 3B, lags BUF RAW SEN's trailing or negative edge over terminal T12, indicated in FIG. 3A, by corresponding zero to fifteen clock periods. This delay feature through its effect on other logic circuits of FIG. 2 will insure that holes in documents passing along the document path do not generate false indications that the trailing edge has passed.

CURRENT SOURCING DIGITAL TO ANALOG CONVERTER AND ASSOCIATED CONTROL LOGIC

A current sourcing digital to analog converter and its related control circuitry are indicated by block 16 in FIGS. 1 and 2.

An input is supplied over line 100 from the PT collector to the inverting input of an SN72311 comparator A1, while a reference voltage representing a Light-/Dark threshold is supplied over a line 112 to the noninverting input of A1. Consider first the case in which the voltage from the PT collector exceeds the programmed intensity of the Light/Dark threshold voltage $V_{TH}$ over line 112 at the A1 noninverting input and A1's output over line 114 is low. A 74LS74 flip-flop FF4 responds to the comparator A1's low output on line 114 to provide a high to AND gate A10 (SN7408) which in cooperation with clock pulses over line 104 provides a high to an OR gate B10 (SN7432). The OR gate, in turn, provides a high to one of three inputs of a positive NAND gate A30 (SN7410). A second input to NAND gate A30 is provided from the output of A1 over line 114 through an INVERTER I16 which provides a high to A30. A third input to A30 is provided by a six-bit up-down counter C118, C120 via positive NAND gates A32, A34 (SN7410) and OR gate B12 (SN7432). When A30 is energized, it provides a up-clock over line 118 to the six-bit up-down counter which is formed by two four-bit counters C118, C120 consisting of two SN74S193's coupled as shown.

Consider next the case in which the voltage over line 100 from the PT collector is less than the voltage representing the programmed intensity of the Light/Dark Threshold over line 112 at the A1 inputs, causing A1's output over line 114 to be high. The high will be inverted by the Inverter I16 to produce a low as input to NAND gate A30 thereby precluding an up-clock output from A30 over line 118.

The high produced over line 114, when the conditions of the last paragraph are realized, is applied to one terminal of a SN7400 positive - NAND gate A22. The output over line 108 from comparator 32 is supplied to the D input of a 74LS74 flip-flop FF6 which provides a high output over a line 122 to a 74LS74 flip-flop FF8 and to a 7408 AND gate at A14. A logic clock pulse is supplied over line 104 to FF6 and to FF8 causing FF8 to provide a second input over 123 and A14. The AND gate A14 then provides a high to the second terminal of AND gate A22, enabling A22 to provide a down-clock signal over line 124 to the CPD terminal of the six-bit up-down counter C118, C120. As briefly indicated above, the up-down counter is formed of two 74LS193 synchronous four-bit up-down counters coupled as shown which is used to operate the digital-to-analog converter, or LED current drive 120.

From the foregoing, it will be seen that the up-down counter C118, C120 is clocked up or down by up or down clock signals over lines 118 and 124 in dependence upon the status of the Light/Dark threshold comparator A1 at the time the delayed trailing edge of a document is indicated by a hole-look-through sensor signal HLT SEN over line 108, going low. If the voltage at the phototransistor collector input over line 100 exceeds the programmed intensity threshold voltage over line 112 at the A1 non-inverting input, A1's output is low and the steering logic provides an up-clock to the synchronous counter C118, C120 when HLT SEN goes low. Incrementing the synchronous counter in this manner increases the LED excitation current by an increment of one. In a similar way, if the voltage at the PT collector input is less than the programmed intensity threshold voltage, A1's output is high. The steering logic then provides one down-clock to the synchronous counter C118, C120 when the HLT SEN next goes low. The LED excitation current is then decreased by one count. Thus, once initialized about some operating point, the LED current counter steps alternately up and down one count with each negative edge on HLT SEN.

In response to a Power on Reset (POR) signal over line 142 to AND gate A12 or a Reset signal over line 144 through AND gate A20 to AND gate A12 (when an alarm has been triggered at FF10) a signal will be supplied over 148 to the inverter I18 and from I18 via line 164 to the MR terminals of the D/A counter. The associated current control logic then will establish the LED operating current at a value determined by the intensity threshold voltage $V_{TH}$ appearing on the Light-/Dark threshold input 112. At the time the D/A counter, i.e. the up-down counter C118, C120, is reset, no LED current flows. As a result, the PT collector voltage at 100 goes higher than the Light/Dark threshold voltage at 112 at A1's output is low. The low on line 114 steers the logic clock to the up-clock input of the up-down counter. Thus, the counter increments with each logic clock until sufficient collector current flows in the detector transistor to bring the PT collector voltage below the Light/Dark threshold voltage. A1's output then goes high and the initial operating point is established.

As the light emitting diode LED and the phototransistor PT age, or their lenses become dirty, the intensity of light detected by the PT decreases. To compensate for this fall-off in detected light intensity, the D/A counter C118, C120 must be incremented to increase current to the LED and thus increase the light intensity from the LED.

Changes in the intensity of light from the LED, as called for in the paragraph above, are provided from the LED current drive circuit 120 in response to changes in the output of the six-bit up-down counter C118, C120. This drive circuit is disclosed in greater detail in FIG. 4 where a 74LS244 buffer B120 receives inputs over lines 150, 152 . . . 160 to drive a D/A resistance ladder comprising resistors R150, R152 . . . R160. The resistance ladder than, in a well known way, provides an output power line 162 to the non-inverting input of an SN72741 operational amplifier A100 in cascade with a second operational amplifier A102 of the same type. The output of A102 is used to drive a transistor 18 which provides the LED current drive over line 11 to the LED as indicated in FIG. 1.

Figure 5:
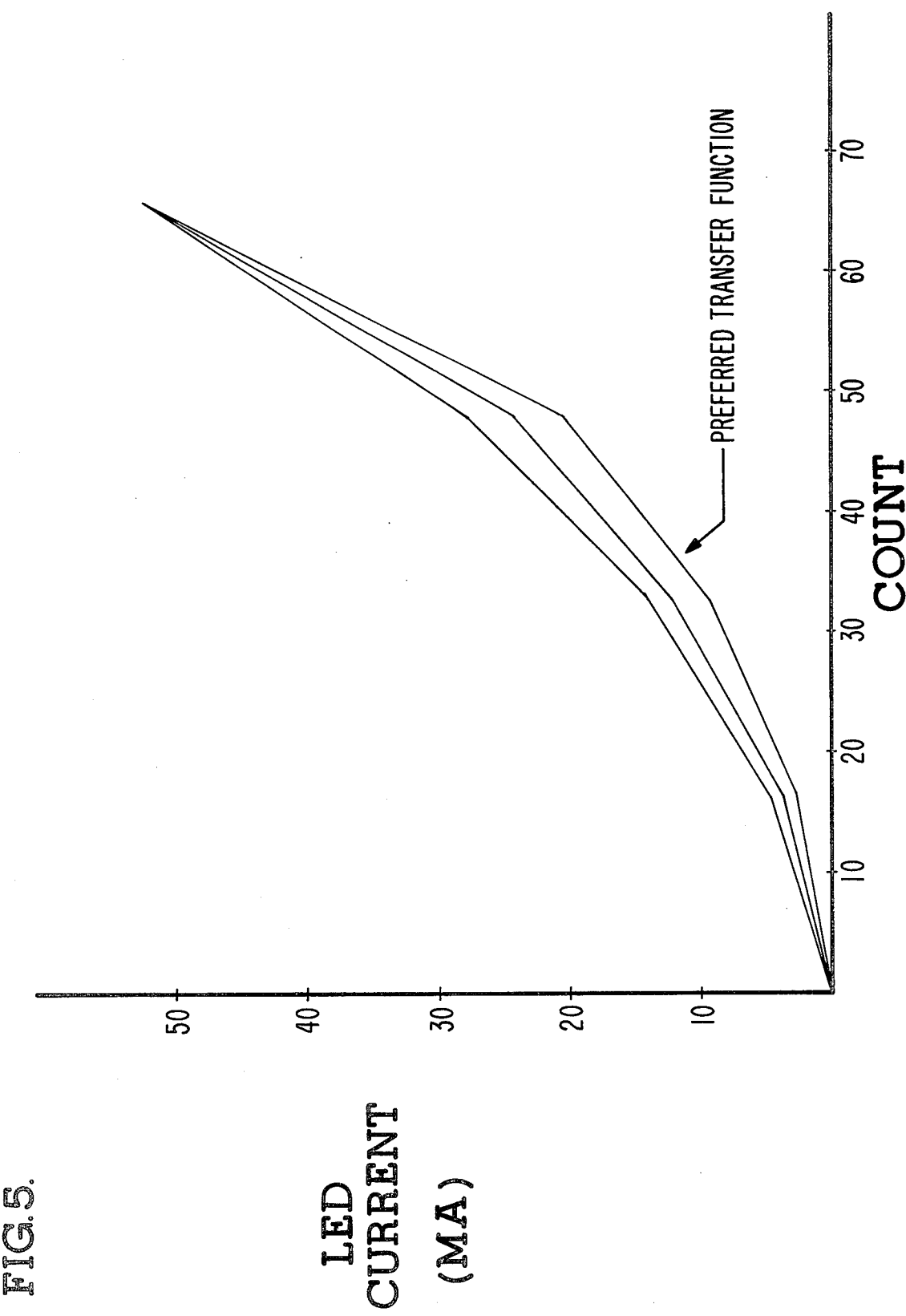
FIG. 5 illustrates curves corresponding to output values provided by a digital-to-analog converter.

The inverters I158 and I160 coupled over lines 158 and 160 from the six-bit up-down counter switch the gain of the operational amplifier A100 and, in conjunction with signals over lines 150, 152, 154 and 156 and Resistor R150, R152, R154 and R156, provide a piecewise linear companding digital-to-analog conversion as shown in FIG. 5. Resistors R159, R161 and R100 are directly associated with the gain of the operational amplifier A100. Resistors R158 and R160 maintain the monotonic characteristics of the curve in FIG. 5 from gain stage to gain stage. Resistors R150, R152, R154 and R156 provide the incremental steps which establish the piece-wise linear segments.

The output of the LED driver 18 is limited to the maximum value set by a count of 64. The limit may be set to a count of 48 or some other count, if desired, by arrangement of appropriate connections from the six-bit up-down counter.

The curves in FIG. 5 illustrate the output in milliamperes over line 11 as a function of the count 0 through 64 into the buffer B120. The current-step curves shown in FIG. 5 are approximate to the values shown and may be satisfied by any strictly monotonic curve which falls within envelopes shown on the characteristic curves. For a zero count, the D/A output current should not be greater than 100 microamperes. For a full count, a minimum of 50 millamperes and a maximum of 60 milliamperes must flow. The full count in the D/A count range of a preferred embodiment may be any value between 48 and 64 inclusive. The transistor 18 and the feedback resistor R18 may be selected to provide many ranges of current drive beyond those set out in this example.

MAXIMUM CURRENT ALARM

To detect the failure of LED phototransistor sensors or any other conditions in which the D/A output current in line 11 approaches the maximum of 60 milliamperes, an alarm circuit is employed such as that indicated by block 20 on FIGS. 1 and 2. With this alarm circuit, as shown in FIG. 2, the up-down, or D/A counter C118, C120 is coupled via lines 154, 156, 158 and 160 to an SN74LS21 dual 4 input AND gate A40. When the D/A counter counts to within four counts of the maximum D/A count, i.e. 60=111100, high inputs on each of lines 154, 156, 158 and 160 to AND gate A40 will produce a high on line 166. The alarm flip-flop FF10 is clocked on the next HLT SEN negative edge and sends an alarm signal over line 168 indicating the existance of a condition needing correction to outside intelligence. Over line 170, the flip-flop FF10 will enable the RESET input for A20.

PACKAGING

Figure 6:
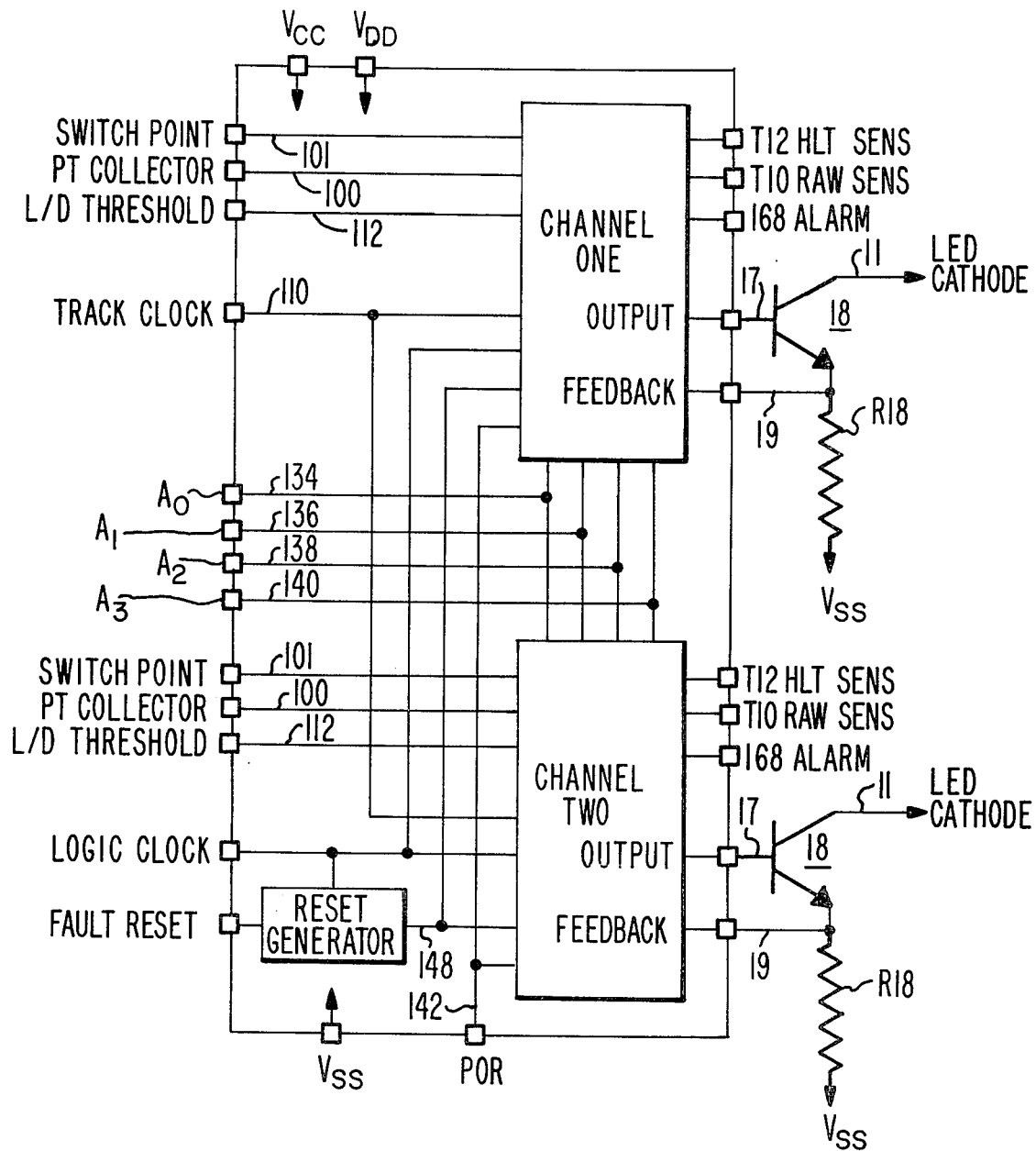
FIG. 6 shows a preferred arrangement of circuits according to the present invention into an integrated circuit chip supporting two TSC's.

Preferred examples of integrated circuits employing the disclosed track sensor controller, or TSC, circuits will include two TSC circuits on a single silicon chip using a 28 pin DIP. All available packaging materials are acceptable. An example of a preferred arrangement is shown in FIG. 6 in which channels 1 and 2 embody integrated circuits. corresponding to the circuits shown in FIGS. 2 and 4 and the power transistor 18 is shown as a separate entity. However, it will be obvious to those skilled in the art that the number of channels is limited only by the state of the art and the limits of pins available in the packages.

What is claimed is:

1. A track sensor controller for controlling the excitation current to a light source operable in cooperative relationship with a light sensor to enable the sensor to detect documents passing between the light source and the sensor along the document travel path of a document sorting machine, comprising:
   a document leading and trailing edge detector indicates first means responsive to signals from the sensor for providing further signals of use in preventing false indications that a document has passed beyond an area monitored by the sensor, where the false indications are caused by light passing through holes, or other light transmitting areas, in a document;
   said first means including means for comparing signals from the sensor and signals from a source of first reference values to derive signals indicating whether documents are present;
   said first means including means for receiving programmed input signals for use in establishing signals of use in preventing a false indication that the trailing edge of a document has passed when, in fact, the edge of a hole has passed;
   said first means employing said derived signals together with said received programmed input signals to generate hole-look-through signals of use in preventing false indications that a document has passed the sensor; and
   second means responsive to signals from the sensor and signals from the first means for providing control signals to a current source coupled to maintain the average intensity of the light source at a preselected value.

2. The invention as claimed in claim 1, in which:
   the second means includes means for comparing signals from the sensor with signals from a second source of reference values to provide additional signals indicating whether the document path appears to be clear of documents, said second means responding to said additional signals and to said hole-look-through signals from the first means to provide said control signals.

3. The invention as claimed in claim 1 or 3, in which:
   the means for deriving hole-look-through signals includes a counter and an additional comparator;
   said counter being coupled to receive said derived signals and provide a plurality of counter outputs to the additional comparator; and
   means coupling said received programmed input signals to said additional comparator for comparison with said counter outputs;
   said additional comparator responding to said programmed input signals and said counter outputs to provide said hole-look-through signals.

4. The invention as claimed in claim 2, in which:
   the second means includes means responsive to said additional signals and to said hole-look-through signals for generating up-count and down-count signals; and
   the second means includes an up-down counter responsive to said up-count and said down-count signals to increment or decrement values stored therein.

5. A circuit for monitoring optical sensors of use with document processors, comprising:
   a leading and trailing edge detector including first means for comparing signals from a sensor and signals from a source of first reference values, said first means including a differential comparator providing first output signals having a first value when the signal from the sensor is stronger than the reference signal, thereby indicating that either a hole is present in a document or that no document is present, and having a second value when the signal is weaker than the reference signal, thereby indicating that a document is present;
   means for receiving programmed input signals for use in establishing signals of use in preventing a false indication that the trailing edge of a document has passed when, in fact, the edge of a hole has passed;
   said leading and trailing edge detector including a counter coupled to count clock pulses during periods in which it receives digital output signals of a first value and to produce output signals indicating the magnitude of said count;
   a second comparator coupled to receive said programmed input signals and said output signals and generate hole-look-through signals of use in establishing passage of a hole rather than the trailing edge of a document;
   D/A control means providing control logic for providing a control signal to control the strength of signals originating from a sensor;
   said control means including a third comparator for comparing signals from a sensor and from a source of second reference values and providing second digital output signals which are variable from times when a sensor senses the presence of a document to times when it senses the document has passed;
   said control means including means coupled responsive to said second digital output signals and to said hole-look-through signals for generating up-count and down-count signals;
   said control means including an up-down counter responsive to said up-count and said down-count signals to increment or decrement values stored therein; and
   a drive circuit coupled responsive to changes in the status of the up-down counter to provide a control signal for use in regulating the light source of a sensor system.

6. A circuit for use in processing signals from sensors, comprising:
   a document leading and trailing edge detector circuit including a first comparator for receiving signals from a sensor and receiving signals from a source of first reference values;
   said comparator providing first digital output signals having a high or a low value depending upon the relative magnitudes of said received signals;
   means for receiving programmed input signals for use in establishing signals of use in preventing a false indication that the trailing edge of a document has passed when, in fact, the edge of a hole has passed;

said edge detector circuit including a counter coupled to count clock pulses during periods in which it receives digital output signals of a first value and to produce output signals indicating the magnitude of said count;

a second comparator coupled to receive said programmed input signals and said output signals and generate hole-look-through signals of use in establishing passage of a hole rather than the trailing edge of a document;

digital-to-analog control means providing control logic including a third comparator for comparing signals from said sensor and from a source of second reference values and providing second digital output signals which are variable from times when the sensor senses the presence of a document to times when it senses the document has passed;

said means providing control logic including means by which it is coupled responsive to said second digital output signals and to said hole-look-through signals for generating up-count and down-count signals;

said means providing control logic including an up-down counter responsive to said up-count and down-count signals to increment and decrement values stored therein, accordingly; and a drive circuit coupled to the up-down counter to provide a control signal for use in adjusting the operating energy to a sensor.

7. The invention as claimed in claim 5 or 6, in which:

the means providing hole-look-through signals includes a counter and a third comparator;

said counter being coupled to receive said first digital output signals and provide a plurality of counter outputs to the third comparator; and a source of programmed input signals coupled to said third comparator for comparison with said counter outputs;

said third comparator responding to said programmed input signals and said counter outputs to provide said hole-look-through signals.

* * * * *